United States Patent
Heidasch

(10) Patent No.: US 8,997,207 B2
(45) Date of Patent: Mar. 31, 2015

(54) MODULAR SECURE DATA TRANSFER

(75) Inventor: Robert Heidasch, Speyer (DE)

(73) Assignee: SAP AG, Walldorf (DE)

(*) Notice: Subject to any disclaimer, the term of this patent is extended or adjusted under 35 U.S.C. 154(b) by 1293 days.

(21) Appl. No.: 12/566,315

(22) Filed: Sep. 24, 2009

(65) Prior Publication Data

US 2011/0072258 A1     Mar. 24, 2011

(51) Int. Cl.
    *G06F 9/00*           (2006.01)
    *H04L 9/08*           (2006.01)

(52) U.S. Cl.
    CPC .................................. *H04L 9/0838* (2013.01)
    USPC .......................................................... 726/15

(58) Field of Classification Search
    CPC .................................................... H04L 9/0838
    USPC .......................................................... 726/15
    See application file for complete search history.

(56) References Cited

U.S. PATENT DOCUMENTS

| | | | | |
|---|---|---|---|---|
| 6,757,693 B2 * | 6/2004 | Taniguchi et al. | | 382/276 |
| 7,143,397 B2 * | 11/2006 | Imaura | | 717/136 |
| 7,242,772 B1 * | 7/2007 | Tehranchi | | 380/223 |
| 2002/0036804 A1 * | 3/2002 | Taniguchi et al. | | 358/443 |
| 2002/0154631 A1 * | 10/2002 | Makansi et al. | | 370/389 |
| 2007/0050516 A1 * | 3/2007 | Bona | | 709/232 |
| 2007/0291774 A1 * | 12/2007 | Herz et al. | | 370/401 |
| 2010/0011007 A1 * | 1/2010 | Bettger et al. | | 707/10 |

FOREIGN PATENT DOCUMENTS

JP          2006244425 A    *    9/2006

* cited by examiner

*Primary Examiner* — Mohammad W Reza
(74) *Attorney, Agent, or Firm* — Blakely Sokoloff Taylor & Zafman LLP

(57) ABSTRACT

A method and system that modularizes a message by separating the message definition data from the message data. The message definition data and message data are transmitted over a secure channel to a target computing device. The message definition data and message data are recombined to form the original message at the target computer using a process corresponding to the modularization process. A key is used to track the associated definitions and message data and determine the corresponding combination process. Separate transmission of the data definitions and message data provides an added level of security. If message data is intercepted and decrypted by a third party, then the data is not easily utilized, because the definition data is absent. Similarly, interception of the message definition is not useful without the message data.

22 Claims, 3 Drawing Sheets

MODULAR SECURE DATA TRANSFER

BACKGROUND

1. Field of the Invention

The invention is related to the field of secure data transfer. Specifically, the embodiments of the invention are related to a method and system for modular secure data transfer.

2. Background

Secure communication channels are established between two computing devices to protect the information being transmitted from one computing device to another from being intercepted and utilized by a third party. These secure communication channels are used to transmit all types of sensitive information including business information, military information, personal information and similar types of information. All secure communication protocols utilize some form of encryption. Types of encryption include symmetrical encryption, asymmetrical encryption, hybrid encryption, message authentication codes, digital signatures and similar encryption technologies.

Most secure communication channels encrypt a message to be transmitted across a communication line that is to be decrypted at the destination. To prevent an intercepting party from decrypting the information, a shared key or similar shared information is utilized such that only the endpoints possess the shared information that enables the decryption of the message. However, nearly all encryption technologies are susceptible to being decrypted by a third party using brute force calculation on the intercepted message or by interception of the shared information such as a shared key. Once the encryption for a secured channel is broken, the entirety of all the messages transmitted using the secured channel becomes open for inspection by the third party intercepting the message over the secured channel.

Similarly, transmission of any message type or document type involves a transmission of some aspect of definition data or data type to define the semantics of the values being transmitted. Multiple messages having similar or identical data types or definition data are routinely transmitted where the definition or type data is largely redundant, thereby making the communication channels less efficient by increasing the overhead of the communication channels.

BRIEF DESCRIPTION OF THE DRAWINGS

Embodiments of the invention are illustrated by way of example and not by way of limitation and the figures of the accompanying drawings in which like references indicate similar elements. It should be noted that different references to "an" or "one" embodiment in this disclosure are not necessarily to the same embodiment, and such references mean at least "one."

DETAILED DESCRIPTION

Figure 1:
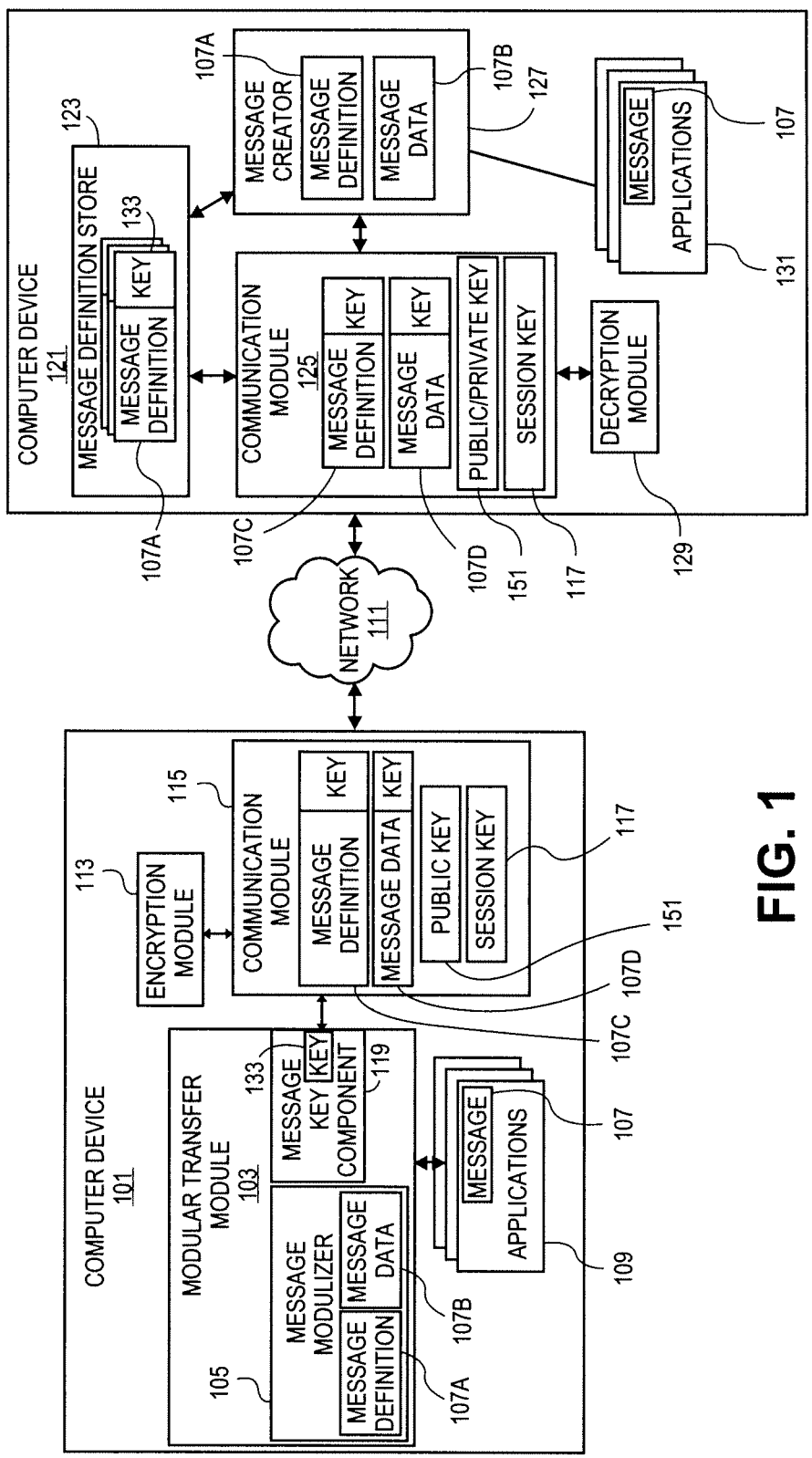
FIG. 1 is a diagram of one embodiment of a modularized secure data transmission system.

FIG. 1 is a diagram of one embodiment of a system for modularized secure communication. In one embodiment, the secure communication system is utilized between two computing devices 101, 121. This communication methodology and system can be used to transmit messages over a network 111. The computing devices 101, 121 can be any type of computing devices including desktop computers, work stations, laptop computers, hand held computers, smart phones, console devices and similar computing devices. The network 111 can be any type of communication network including a local area network (LAN), a wide area network (WAN), such as the Internet, or similar network. The network 111 may include any number of networking devices that are intermediate devices between the computing devices 101, 121 including network elements and other computing devices that can be wireless or wired to one another using a communication medium. The network can include wireless and/or wired communication mediums. The system and method of modularized communication disclosed herein can be utilized between any number or type of computing devices 101, 121.

In one embodiment, computing device 101 is a transmitting device that has a message to be communicated securely to the recipient computing device 121. This simplified scenario, where the computing device 101 is solely a transmitting computing device and the computing device 121 is solely a receiving computing device is provided by way of example. One of ordinary skill in the art would understand that both computing devices 101,121 can be both transmitting devices and receiving devices. The principles, functions and structures discussed herein are applicable to any combination of transmitting and receiving devices.

In one embodiment, the transmitting computing device 101 includes a modular transfer module 103, an encryption module 113, a communication module 115 and a set of applications 109. A 'set,' as used herein, refers to any positive whole number of items including one item. An application 109 could be any type of computing program. One of ordinary skill in the art would understand that any computer program can generate a message that needs to be transmitted to another computing device 121. Computer programs can include user applications, enterprise applications, operating system components and similar programs.

The application 109 generates a message 107 to be transmitted to the computing device 121. The message 107 can be any type of data in any format or having any message type. The data can be a document, business logic, program code or similar data. For example, the message can be an extensible markup language (XML) document or hypertext markup language (HTML) document or similar document. The applications 109 pass the message 107 to the modular transfer module 103 as an initial step in transmitting the message 107 to the computing device 121 over a secure communication channel. The computing device 101 includes any number of modular transfer modules 103 to handle any number of different message or document types. In one embodiment, modular transfer modules 103 can handle multiple types of data files. In other embodiments, separate modular transfer modules 103 are utilized for different types of messages.

The modular transfer module 103 includes a message modulizer 105 and a message key component 119. The message modulizer 105 analyses the message 107 received from the application 109 and determines the message type or format and separates the format data, metadata and similar data from the value data of the message. For example, if the message 107 to be transmitted were an instance of an object, then the object class data would be separated from the particular values of the instance. The message is separated into a message definition 107A and message data 107B. The format data, metadata and similar data are placed in a message definition file 107A, while the remainder of the message 107, becomes a non-formatted or non-typed set of message data 107B without any definition data.

The message definition 107A is then passed to the message key component 119, which generates a key that is unique to the message definition 107A. The message key component 119 can use a hashing algorithm, message authentication code algorithm, or similar process for generating a unique key for any given message definition 107A. The message definition 107A, the message data 107B and the key are then passed to a communication module 115 that manages the transfer of the data using conventional secure communication methodologies.

The communication module 115 can manage the transfer of the message definition data 107A, the message data 107B and key over secure channel. The secure communication channel can be created using symmetrical encryption, hybrid encryption, asymmetrical encryption or similar encryption technology. Secure communication channels can be virtual private networks, connections using secure socket layer or similar secure communication channel protocols.

The secure communication channel can use the encryption module 113 to encrypt the contents of the data to be transmitted over the network 111. The encryption module 113 can use any encryption algorithm including block ciphers, streaming ciphers, public key cryptography algorithms such as RSA and similar encryption algorithms. In one example embodiment, the secure communication channel uses a public key cryptography system where the public key 151 of the recipient device is obtained by the communication module 115. The communication module 115 then generates a session key 117 that is transmitted to the recipient computing device 121. The public key 151 and the session key 117 are then utilized by the encryption module 113 to encrypt the data to be sent over the secure communication channel. This data includes the message definition combined with the key 107C, the message data combined with the key 107D or similar sets of data. These portions of the message are separately transmitted as packets such that if any packet or similar component of the secure communication is intercepted by a third party, even if the encryption is broken, the third party is unable to obtain both the message data 107B and the message definition 107A. If the interceptor only receives the message data 107B, then the semantics of that data remain secure because the data is likely to be uninterpretable without the information stored in the message definition 107A. The key 133 is utilized to correlate the message data 107B that is transmitted to the recipient computing device 121 with the appropriate message definition 107A. A message data key must be matched with the key for a message definition to re-create the original message 107.

The receiving computing device 121 includes a message definition store 123, a communication module 125, a message creator 127 and a decryption module 129, as well as, a set of applications and programs 131 which are the ultimate recipient of the message 107. The communication module 125 manages the establishment of the secure communication channel in conjunction with communication module 115 of the transmitting computing device 101. The communication module 125 provides a public key 151. The public key can be part of a public key/private key pair. The communication module 125 provides the public key 151 to the sending computing device 101 upon receiving a request to establish a secure communication channel. In exchange, the communication module 125 receives the session key 117 from the transmitting commuting device 101 and communication module 115.

The session key 117 and the public key and/or private key are used by the decryption module 129. The decryption module 129 uses the same algorithm or a mirror of the algorithm used by the encryption module 113 to decrypt the received message components including a message definition and key 107C and the message data and key 107D. The decrypted message definition 107A and message data 107B is then returned to the communication module 125 and passed to the message creator 127 and/or the message definition store 123. Either the message definition store 123 or the message creator 127 matches the message definitions 107A received with the message data 107B received using the respective associated keys 133. The message definition store 123 stores a copy of each of the message definitions 107A that is received across the network 111 along with keys 133 that are associated with the message definition 107A. Each message data and key 107D component that is received over the secure communication channel is matched with a message definition 107A using the keys.

The message creator 127 utilizes an algorithm that is a mirror or inversion of the modular transfer module 103 to merge the message definition 107A with the message data 107B to recreate the original message 107. The original message 107 can be broken up into multiple message definitions 107A and/or message data 107B components. Each of these components can be merged into the original message 107 using any algorithm that reverses the corresponding algorithm used to separate the data in the modular transfer module 103. The reformed message 107 is then passed on to the application 131 or program to which it is addressed for further processing based on the nature of the program.

Figure 2:
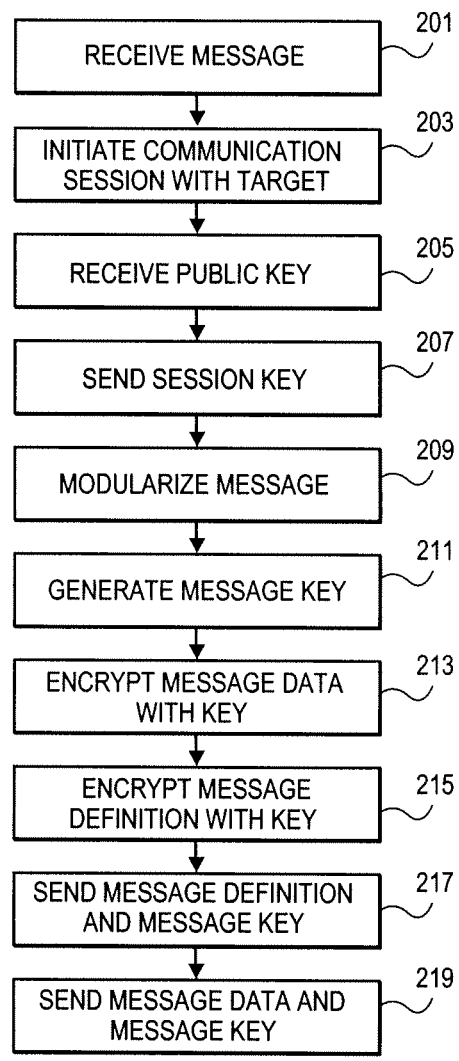
FIG. 2 is a diagram of one embodiment of a process for transmitting a modularized message securely.

FIG. 2 is a diagram of one embodiment of a process for transmitting a modularized message securely. In one embodiment, the process is initiated by the receipt of a message from a program (block 201). The message is received by the modular transfer module. The message can be any type of data having any format or type. The message modularization and secure channel establishment can occur in any order (e.g., the secure channel can be established even before the message is received) including in parallel.

The secure channel is established by initiation of a communication session between the transmitting computing device and the receiving or 'target' computing device (block 203). The establishment of the secure communication channel can utilize any secure communication protocol, algorithm or technology. In one embodiment, the secure communication protocol utilizes a public key/private key protocol. The target computing device sends the transmitting computing device its public key (block 205). In response to receiving the public key of the target computing device, the transmitting computing device sends a session key to the target computing device (block 207). The session key can be encrypted using the public key. Once these keys are exchanged they are utilized to encrypt the data sent over the secure communication channel.

The message is modularized before being sent over the secure communication channel (block 209). The modularization includes the separation of definition or metadata in the message from the message data. For example, the message can include any number of objects. The object definition or class data is separated from the instance values. The result of the separation is a set of message definition files and a set of message data files. A message key is generated by a message key component (block 211). The message key can be generated using a hashing algorithm or similar algorithm that can create a unique key based on a message definition or similar input. The message key is associated with each message definition file and each message data file that is to be transmitted. The key will be used to reassociate the message definitions with the message data and to reform the original message.

The message definition and message key combination and the message data and message key combinations are then encrypted to be sent over the secure communication channel (blocks 213 and 215). The message definition and message key combination and the message data and message key combination can be encrypted in any relative order. Any encryption algorithm can be utilized including any block cipher or streaming cipher algorithm. Once the message definition and message key combination and the message data and message key combinations are encrypted they can be transmitted over the secure communication channel to the target computer (blocks 217 and 219). The message definition and message data and message key combinations can be transmitted in any relative order. However, the message data cannot be processed until the message definition is sent. In some circumstances, a message definition is known to have been previously sent and is not retransmitted when a new message with the same message definition is received. This decreases the amount of data that must be sent over the secure communication channel.

Figure 3:
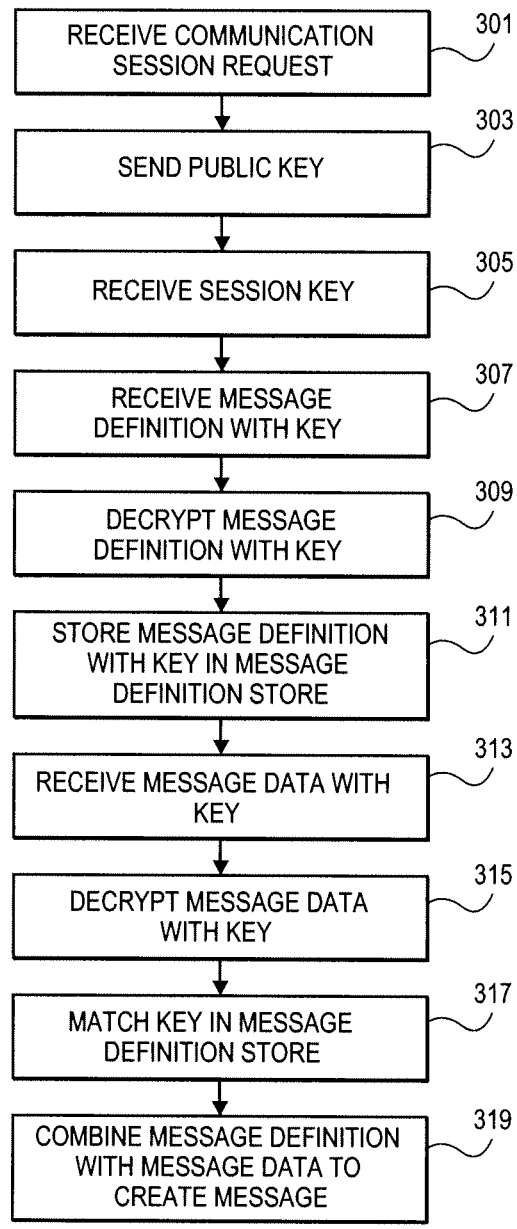
FIG. 3 is a diagram of one embodiment of a process for assembling a message received in a modularized secured communication format.

FIG. 3 is a diagram of one embodiment of a process of assembling a message in a modularized secured communication form. The process can be initiated in response to receiving a request for a secure communication channel (block 301). The secure communication channel can be established using any secure communication protocol, algorithm or technology. In one embodiment, the secure communication channel is established using a public key/private key encryption protocol. In response to the request to establish the secure communication channel, a public key is provided to the transmitting computing device (block 303). In response to sending the public key, a session key is received that is encrypted using the public key (block 305). These keys are then utilized for decrypting the data sent over the secure communication channel.

The process continues when a message is received over the secure communication channel. The message is sent in modules where the message definition is sent separately from the message data. The message definition and message data can be received in any order. The example of the message definition being received first is provided for sake of clarity. In scenarios where the message data is received first, the message data can be buffered or similarly stored for a set amount of time until the message definition is received. The message definition is received along with a message key (block 307). The message definition and message key combination is encrypted. The message definition and message key are decrypted using a decryption algorithm that mirrors or complements the encryption algorithm that was utilized by the transmitting computing device (block 309).

The message definition store can then be checked to determine whether the received message definition and message key have previously been received. If the message definition store includes the received message definition and key, then they can be discarded. If the message definition store does not include the received message definition store and key then they are stored in the message definition store (block 311). If the message definition store tracks a time to live or similar value for stored definitions, then these values are updated upon receipt of a previously received message definition. Also message definition and keys can be specific to a secure communication channel or session. A message definition store can store message definitions and keys for multiple connections and sessions.

A message data file can be received from the transmitting computing device at any time (block 313). Any number of message data files can be received each including a key. The message data files can be associated with any message definition or key. Any number of message data files can be generated for a given message. The received message data and corresponding keys are decrypted (block 315). The decryption algorithm mirrors or corresponds to the encryption algorithm that is used by the transmitting computer to encrypt the message. The decrypted key is used to match the message data with a message definition (block 317). The matching message definition and message data are then provided to the message creator. The message creator combines the message definition and message data in a process that reverses that utilized by the modular transfer module to create the separate message definition and message data files. The combined message definition and message data files generate the original message (block 319). The original message can then be passed on to the intended computer program or application.

In one embodiment, the pattern analysis system can be implemented as a set of hardware devices. In another embodiment, the system components are implemented in software (for example, microcode, assembly language or higher level languages). These software implementations can be stored on a computer-readable medium. A "computer-readable" medium can include any medium that can store information. Examples of the computer-readable medium include a read only memory (ROM), a floppy diskette, a CD Rom, a DVD, a flash memory, a hard drive, an optical disc or similar medium.

In the foregoing specification, the invention has been described with references to specific embodiments. It will, however, be evident that various modifications and changes can be made thereto without departing from the broader spirit and scope that is set forth in the appended claims. The specification and drawings are accordingly to be regarded in illustrative rather than a restrictive sense.

What is claimed is:

1. A method comprising:
   receiving a message;
   separating definition data and non-definition data within the message;
   generating a message key unique to the definition data;
   encrypting the definition data combined with the message key and non-definition data combined with the message key, each combination encrypted separately, both combinations encrypted using a same encryption key; and
   transmitting the definition data and non-definition data to a target computing device separately.

2. The method of claim 1, further comprising:
   establishing a secure communication channel between a transmitting computing device and a target computing device using any one of symmetric encryption, asymmetric encryption or hybrid encryption.

3. The method of claim 1, wherein the message key is valid for a communication session.

4. The method of claim 1, wherein the definition data is any one of a format for the non-definition data, metadata about the non-definition data, or object class data, and
   further wherein the non-definition data is any one of non-formatted data, non-type set data, or an instance of an object class.

5. A method comprising:
   receiving, at a target computing device, a message definition combined with a message key and message data separately combined with the message key, the combinations received over a secure communication channel;
decrypting the combinations at the target computing device; and
combining the message definition and message data to recreate a message.

6. The method of claim 5, further comprising:
identifying a match between the message definition and message data using the message key.

7. The method of claim 5, wherein the key is unique to a message definition and a session.

8. The method of claim 5, further comprising:
storing the message definition in a message definition store on the target computing device.

9. The method of claim 8, further comprising:
receiving a second message data with the key; and
combining the second message data with the message definition.

10. The method of claim 5 further comprising:
determining whether the message definition is present in a message store on the target computing device; and
discarding the message definition received responsive to a determination that the message definition is present in the message store on the target computing device.

11. An apparatus comprising:
a first modular transfer module to process a message to generate a first message definition and first message data;
a message key component coupled to the first module transfer module;
a communication module to securely transmit the first message definition and first message data separately;
an encryption module to encrypt the first message definition combined with a message key and the first message data separately combined with the message key, the encryption module using a same encryption key to encrypt both combinations.

12. The apparatus of claim 11, further comprising:
a second modular transfer module to process a second message to generate a second message definition and second message data, the first and second message definition corresponding to separate formats.

13. An apparatus comprising:
a message creator to combine a first message definition received in combination with a first message key with a first message data separately received in combination with the first message key to generate a first message;
a communication module to receive the combinations; and
a decryption module to decrypt the first message definition and the first message data.

14. The apparatus of claim 13, further comprising: a message definition store to store the first message definition and to match the message key with the first message definition.

15. The apparatus of claim 13, further comprising: a message key matching component to match the first message definition and the first message data using the message key.

16. A non-transitory computer-readable medium having instructions stored herein, which when executed cause a computer to perform a set instructions comprising:
receiving a first message;
separating a first message definition and a first message data for the first message;
encrypting the first message definition combined with a message key and the first message data separately combined with the message key by a transmitting computing device;
encrypting the combinations separately; and
transmitting the combinations separately to a target computing device.

17. The non-transitory computer-readable medium of claim 16, having further instructions stored therein, which when executed cause a computer to perform a further set of instructions comprising: generating the message key to uniquely identify the first message definition wherein the key is unique to a session.

18. The non-transitory computer-readable medium of claim 16, having further instructions stored herein, which when executed cause a computer to perform a further set of instructions:
establishing a secure communication channel between the transmitting computer and the target computer using any one of symmetric encryption, asymmetric encryption or hybrid encryption.

19. A non-transitory computer-readable medium having instructions stored therein, which when executed cause a computer to perform a set of instructions comprising:
receiving a first message definition and a first message data over a secure communication channel, wherein the first message definition and first message data are each received as separate units each combined with a message key, the combinations of the first key and each of the first message definition and the first message data separately encrypted;
decrypting the first message definition and the first message data;
identifying a match between the first message data and the first message definition;
combining the first message data and the first message definition to form a message.

20. The non-transitory computer-readable medium of claim 19, having further instructions stored therein, which when executed cause a computer to perform a further set of instructions comprising:
searching a message definition store for a matching message definition for the first message data.

21. The non-transitory computer-readable medium of claim 20, wherein the searching is a look up using a message key received with the first message data.

22. The non-transitory computer-readable medium of claim 19, having further instructions stored therein, which when executed cause a computer to perform a further set of instructions comprising:
storing the first message definition in a message definition store to be combined with a second message data that is subsequently received.

* * * * *